US009169779B2

(12) United States Patent
Winter

(10) Patent No.: US 9,169,779 B2
(45) Date of Patent: Oct. 27, 2015

(54) SYSTEMS AND METHODS FOR ALTERING INLET AIRFLOW OF GAS TURBINE ENGINES

(75) Inventor: Michael Winter, New Haven, CT (US)

(73) Assignee: United Technologies Corp., Hartford, CT (US)

( * ) Notice: Subject to any disclaimer, the term of this patent is extended or adjusted under 35 U.S.C. 154(b) by 2029 days.

(21) Appl. No.: 11/869,040

(22) Filed: Oct. 9, 2007

(65) Prior Publication Data
US 2009/0092482 A1 Apr. 9, 2009

(51) Int. Cl.
F01D 17/00 (2006.01)
F02C 7/042 (2006.01)
F02C 7/047 (2006.01)
F02K 3/06 (2006.01)

(52) U.S. Cl.
CPC ............... *F02C 7/042* (2013.01); *F02C 7/047* (2013.01); *F02K 3/06* (2013.01)

(58) Field of Classification Search
CPC ............ F02C 7/042; F02C 7/047; F02K 3/06
USPC ......... 415/126, 128, 150, 151, 157, 159, 914; 137/15.1, 15.2
See application file for complete search history.

(56) References Cited

U.S. PATENT DOCUMENTS

| 3,652,036 | A | * | 3/1972 | Sans et al. ............... 244/53 B |
| 3,664,612 | A | * | 5/1972 | Skidmore et al. .......... 244/53 B |
| 4,047,911 | A | * | 9/1977 | Krojer ....................... 55/306 |
| 4,428,194 | A | * | 1/1984 | Stokes et al. .............. 60/779 |
| 4,752,049 | A | | 6/1988 | Cole |
| 5,005,782 | A | * | 4/1991 | Falempin et al. .......... 244/53 B |
| 5,114,100 | A | | 5/1992 | Rudolph et al. |
| 5,706,651 | A | | 1/1998 | Lillibridge et al. |
| 5,738,298 | A | | 4/1998 | Ross et al. |
| 6,045,325 | A | | 4/2000 | Horvath et al. |
| 6,334,753 | B1 | * | 1/2002 | Tillman et al. ............. 415/1 |
| 6,364,254 | B1 | | 4/2002 | May |
| 6,688,558 | B2 | | 2/2004 | Breer et al. |
| 6,910,370 | B2 | | 6/2005 | Clark et al. |
| 6,964,397 | B2 | | 11/2005 | Konings |
| 2005/0022866 | A1 | * | 2/2005 | Sakurai et al. ............ 137/15.1 |
| 2005/0274103 | A1 | | 12/2005 | Prasad et al. |

* cited by examiner

*Primary Examiner* — Edward Look
*Assistant Examiner* — Jesse Prager
(74) *Attorney, Agent, or Firm* — Carlson, Gaskey & Olds, PC

(57) ABSTRACT

Systems and methods for altering airflow to gas turbine engines are provided. In this regard, a representative system includes a gas turbine engine inlet having a slat, the slat being movable between a retracted position and an extended position. In the extended position, the slat increases an effective diameter of the inlet compared to the diameter of the inlet when in the retracted position.

19 Claims, 2 Drawing Sheets

SYSTEMS AND METHODS FOR ALTERING INLET AIRFLOW OF GAS TURBINE ENGINES

BACKGROUND

1. Technical Field

This disclosure generally relates to gas turbine engines.

2. Description of the Related Art

Aircraft engine nacelle inlets are designed to meet many diverse flight conditions such as take-off, crosswind, climb, cruise and windmill. These disparate flight conditions result in competing design considerations often times resulting in a nacelle configuration that is designed for less than optimal performance at cruise conditions. By way of example, the inlet diameter of a typical nacelle typically is 10% to 20% larger than is generally considered optimal at cruise conditions.

SUMMARY

Systems and methods for altering airflow to gas turbine engines are provided. In this regard, an exemplary embodiment of a method comprises selectively increasing an effective diameter of a nacelle inlet while a gas turbine engine mounted within the nacelle is operating.

An exemplary embodiment of a system comprises: a gas turbine engine inlet having a slat, the slat being movable between a retracted position and an extended position; in the extended position, the slat increasing an effective diameter of the inlet compared to the diameter of the inlet when in the retracted position.

Another exemplary embodiment of a system comprises: a slat configured as an annular segment; and a slat actuator operative to move the slat between a retracted position and an extended position.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for altering inlet airflow to gas turbine engines are provided. In this regard, several exemplary embodiments will be described. Specifically, some embodiments involve the use of slats located about the inlet of a nacelle. In some embodiments, the slats are pneumatically actuated by bleed air that also can be used to provide anti-icing for the inlet. The slats can be extended, such as during take-off and landing configurations that typically involve an increased need for inlet airflow. However, the slats can be fully retracted, such as during cruise, thereby reducing drag of the nacelle. Notably, the use of such slats can enable an overall smaller nacelle to be used, e.g., a nacelle that is optimally designed for cruise conditions.

Figure 1:
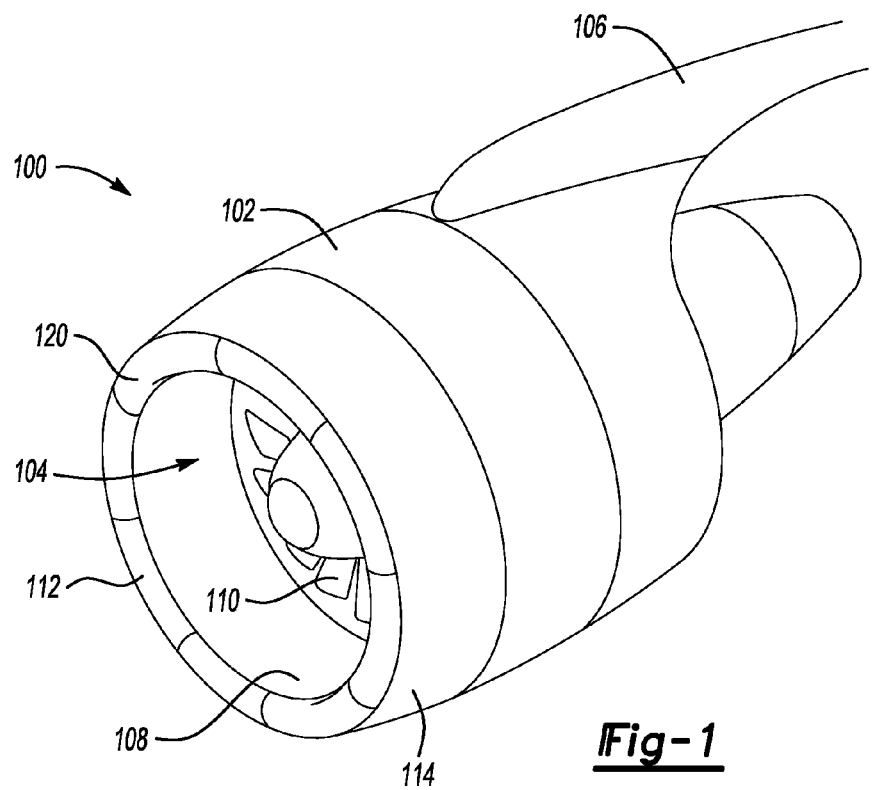
FIG. 1 is a schematic diagram depicting an embodiment of a system for altering inlet airflow to a gas turbine engine.

FIG. 1 is a schematic diagram depicting an embodiment of a system for altering inlet airflow to a gas turbine engine. As shown in FIG. 1, system 100 includes a power plant that incorporates a nacelle 102 and a gas turbine engine 104. It should be noted that although the gas turbine engine is configured as a turbofan in this embodiment, other types of gas turbine engines can be used.

Nacelle 102 is attached to a pylon 106 that mounts the power plant to a wing of an aircraft (not shown). Nacelle 102 includes an inlet 108 that includes a leading edge 112. The inlet is configured to direct a flow of air toward an intake of the engine 104, which includes a fan 110. Aft of the leading edge on an exterior of the nacelle is an inlet nose cowl 114. Other portions of the nacelle are not relevant to this discussion and will not be described in greater detail.

The embodiment of FIG. 1 also includes inlet slats, e.g., slat 120, that are shown in their retracted positions in FIG. 1. The inlet slats are generally located at the lip of the nacelle and generally conform to the shape of the lip and inlet. Thus, in this embodiment, each slat is configured as a compound annular segment, i.e., each slat is annular along its length as well as in cross-section. In other embodiments, various other shapes can be used.

Figure 2:
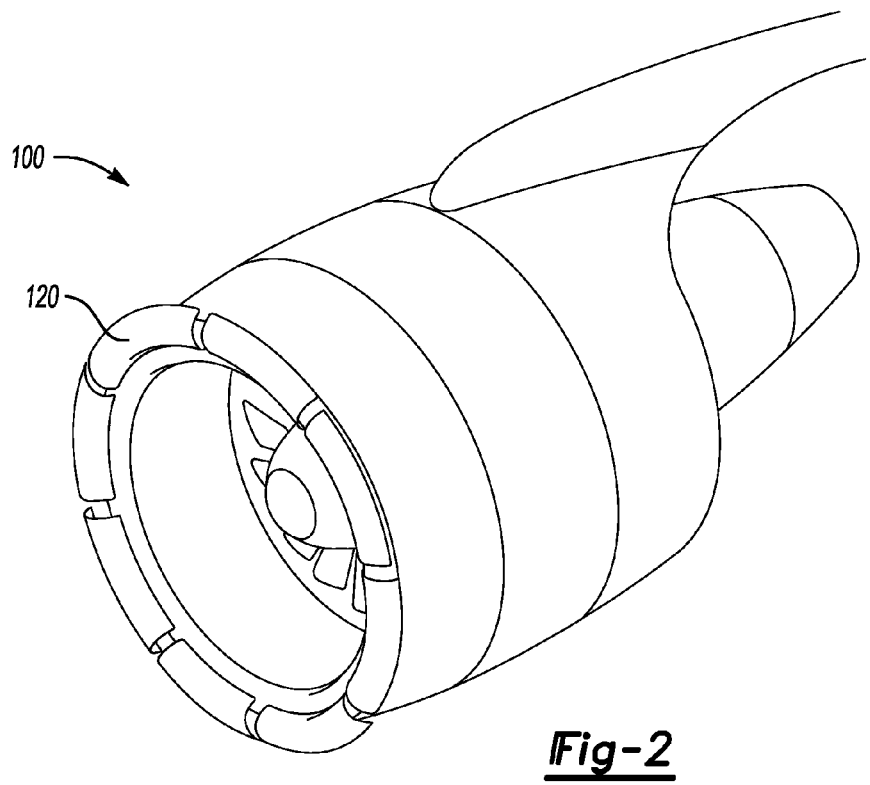
FIG. 2 is a schematic diagram of the embodiment of FIG. 1, with inlet slats shown in extended positions.

In FIG. 2, the inlet slats are shown in their respective extended positions. In the extended positions, the slats generally increase an outer diameter of the inlet, thereby enabling an increase in airflow to the gas turbine engine. In operation, the slats are typically deployed to their extended positions when an increase in airflow is desired, such as during takeoff and/or landing. During cruise conditions, however, the increase in surface area and corresponding profile drag attributable to the extended slats may be undesirable. Therefore, during cruise conditions, for example, the slats typically can be retracted, thereby accommodating an inlet design that is more optimal for cruise conditions.

It should be noted that although the slats in the embodiment of FIGS. 1 and 2 are configured as segments that separate from each other when extended, various other configurations can be used. By way of example, slats that overlap each other even when extended could be used. Additionally or alternatively, various other techniques can be used that alter the thickness of the nacelle lip. Notably, selective altering of the inner diameter and/or outer diameter of the nacelle lip can affect airflow into the engine. In this regard, geometric changes that avoid flow separation are typically preferred.

Figure 3:
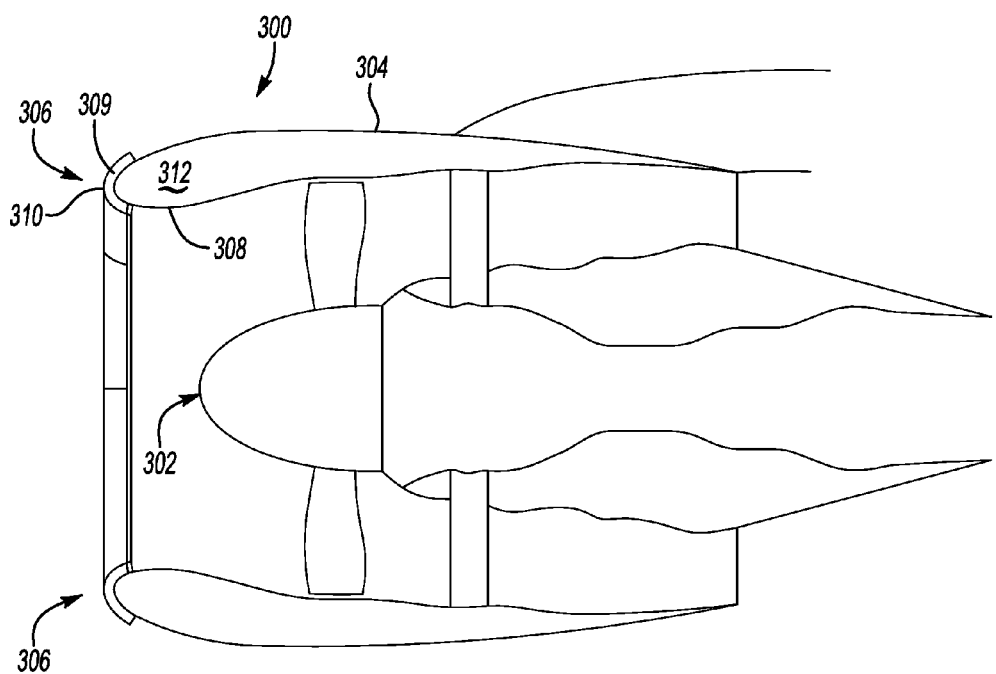
FIG. 3 is a schematic view of another embodiment of a system for altering inlet airflow to a gas turbine engine.

FIG. 3 schematically depicts another embodiment of a system for altering inlet airflow to a gas turbine engine. As shown in FIG. 3, system 300 incorporates a gas turbine engine 302 about which a nacelle 304 is positioned. A lip 306 of the nacelle incorporates extendable slats, e.g., slat 310, that can be moved from retracted positions (shown in FIG. 3) to extended positions (shown in FIG. 4). It should be noted that the lip of the nacelle defines an interior annular plenum 312 through which bleed air can be routed for providing inlet anti-icing, for example. In this regard, reference is made to the schematic diagram of FIG. 4, which depicts a portion of plenum 312 and an inlet slat in greater detail. The lip 306 of the nacelle has a generally parabolic shape having a top side 307 that melds into a bottom side 308 at a mid-point 309 forming a leading edge of the lip 306. The slat 310 has a shape that mimics that parabolic shape of the lip 306 and contacts the bottom side 308 and the top side 307 to mate therewith if in the retracted position.

Figure 4:
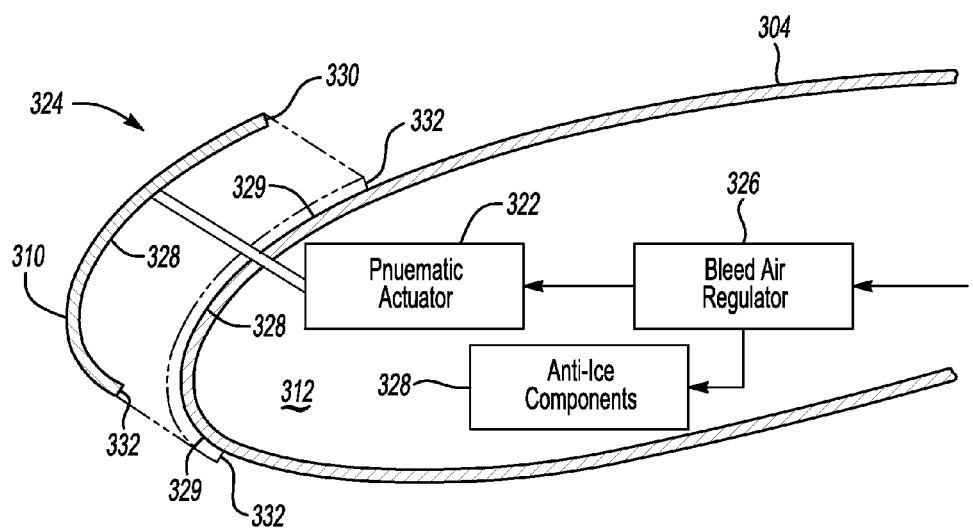
FIG. 4 is a schematic diagram of another embodiment of a system for altering inlet airflow to a gas turbine engine, showing detail of the pneumatic slat actuator and anti-icing components located in the inlet plenum.

As shown in FIG. 4, plenum 312 is defined by spaced inner and outer surfaces 314, 316 of the nacelle that interconnect at the leading edge 320. In this embodiment, various components are located within the plenum, including a pneumatic actuator 322 that is operative to alter a position of slat 310. Specifically, the pneumatic actuator is operative to move the slat between a retracted position (indicated by phantom lines in FIG. 4) and an extended position 324. Notably, in some embodiments, various intermediate positions between the extended and retracted positions can be provided. As shown in FIG. 4, the slat 310 has an aft inner surface 328 that rests on top of and conforms to a forward surface 329 of the nacelle 304 along the entire length of the slat 310 from end 330 to end 332 thereof in the retracted position (see the phantom lines in FIG. 4).

In the embodiment of FIG. 4, engine bleed air is provided to the pneumatic actuator 322 via a bleed air regulator 326. The bleed air regulator also provides bleed air to inlet anti-icing components 328, such as valves and manifolds, which are configured to heat the inlet in order to prevent ice build-up. Notably, the bleed air regulator receives a supply of bleed air and regulates that bleed air for use by the pneumatic actuator and anti-icing components. Clearly, various allocations of bleed air supply among the components that use that supply can be accommodated by the regulator.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A system for altering inlet airflow to a gas turbine engine comprising:
a gas turbine engine inlet having a top side and a bottom side meeting at a leading edge thereof, and a slat, the slat being movable between a retracted position and an extended position;
in the extended position, the slat increasing an effective diameter of the inlet compared to the diameter of the inlet when in the retracted position; and in the retracted position, said slat has an aft inner surface that conforms along its entire length to and rests atop a forward surface of the inlet on said lip over said top side and said bottom side beyond the leading edge thereof.

2. The system of claim 1, wherein:
the inlet comprises a slat assembly, the slat being a first slat of the slat assembly; and
the slat assembly comprises additional slats that are annularly arranged about a lip of the inlet.

3. The system of claim 2, wherein:
each of the slats is movable between a retracted position and an extended position;
the extended position of each of the slats is located radially outward, with respect to a centerline of the inlet, from a corresponding retracted position.

4. The system of claim 1, further comprising a pneumatic actuator operative to move the slat between the extended position and the retracted position.

5. The system of claim 4, further comprising a bleed air regulator operative to provide air to the pneumatic actuator for actuating the slat.

6. The system of claim 5, wherein the bleed air regulator is further operative to provide bleed air for anti-icing the inlet.

7. The system of claim 5, wherein:
the inlet defines an inlet plenum; and
the pneumatic actuator and bleed air regulator are located within the inlet plenum.

8. The system of claim 1, further comprising a gas turbine engine positioned to receive intake air via the inlet.

9. The system of claim 1, wherein the gas turbine engine is a turbofan.

10. A system for altering inlet airflow to a gas turbine engine comprising:
a slat configured as an annular segment, said annular segment having a generally parabolic shape; and
a slat actuator operative to move the slat between a retracted position in which said slat conforms along its entire length to and rests atop a lip and on a top and on a bottom of a leading edge of said inlet, and an extended position wherein:
the system further comprises a gas turbine engine inlet;
the slat is mounted to the inlet; and
in the extended position, the slat increases an effective diameter of the inlet compared to the diameter of the inlet when in the retracted position.

11. The system of claim 10, wherein:
the system comprises a slat assembly, the slat being a first slat of the slat assembly; and
the slat assembly comprises additional slats that are configured as annular segments.

12. The system of claim 11, wherein the slats of the slat assembly are pneumatically actuated.

13. The system of claim 12, further comprising a bleed air regulator operative to provide air for actuating at least one of the slats of the slat assembly.

14. The system of claim 13, wherein the bleed air regulator is further operative to provide bleed air for anti-icing the inlet.

15. The system of claim 12, wherein in the extended positions, the slats of the slat assembly are located radially outward from corresponding retracted positions.

16. A method for altering airflow to a gas turbine engine comprising:
selectively increasing an effective diameter of a nacelle inlet while a gas turbine engine mounted within the nacelle is operating wherein increasing the diameter comprises extending movable inlet slats located in a vicinity of the inlet and wherein decreasing said effective diameter of said nacelle inlet comprises resting said inlet slats that have an aft inner surface that conforms along its entire length and rests on a lip, a top surface and a bottom surface of a nacelle inlet at a leading edge thereof.

17. The method of claim 16, wherein extending movable inlet slats comprises using bleed air to move the slats.

18. The method of claim 17, further comprising additionally using the bleed air to anti-ice the inlet.

19. A system for altering inlet airflow to a gas turbine engine comprising:
a gas turbine engine inlet having a slat, the slat being movable between a retracted position and an extended position wherein the extended position, the slat increasing an effective diameter of the inlet compared to the diameter of the inlet when in the retracted position;
a pneumatic actuator operative to move the slat between the extended position and the retracted position;
a bleed air regulator operative to provide air to the pneumatic actuator for actuating the slat; and,
wherein the inlet defines an inlet plenum and the pneumatic actuator and bleed air regulator are located within the inlet plenum.

\* \* \* \* \*

UNITED STATES PATENT AND TRADEMARK OFFICE
CERTIFICATE OF CORRECTION

| | | |
|---|---|---|
| PATENT NO. | : 9,169,779 B2 | Page 1 of 1 |
| APPLICATION NO. | : 11/869040 | |
| DATED | : October 27, 2015 | |
| INVENTOR(S) | : Michael Winter | |

It is certified that error appears in the above-identified patent and that said Letters Patent is hereby corrected as shown below:

IN THE CLAIMS:

In claim 1, column 3, line 55; delete "said" and insert --a-- (first occurrence)

In claim 2, column 3, line 61; delete "a" and insert --said--

Signed and Sealed this
Eighth Day of March, 2016

Michelle K. Lee
*Director of the United States Patent and Trademark Office*